Figure 4:
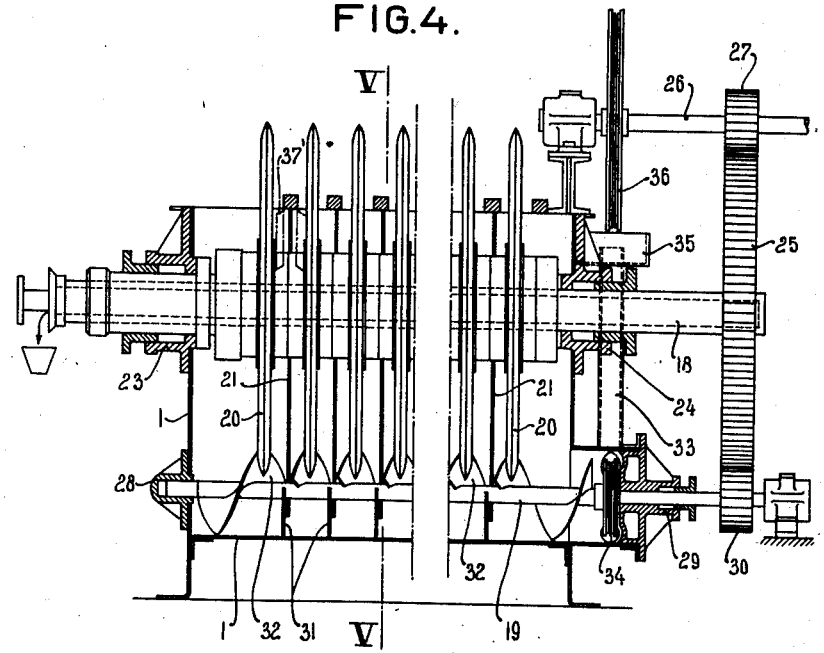

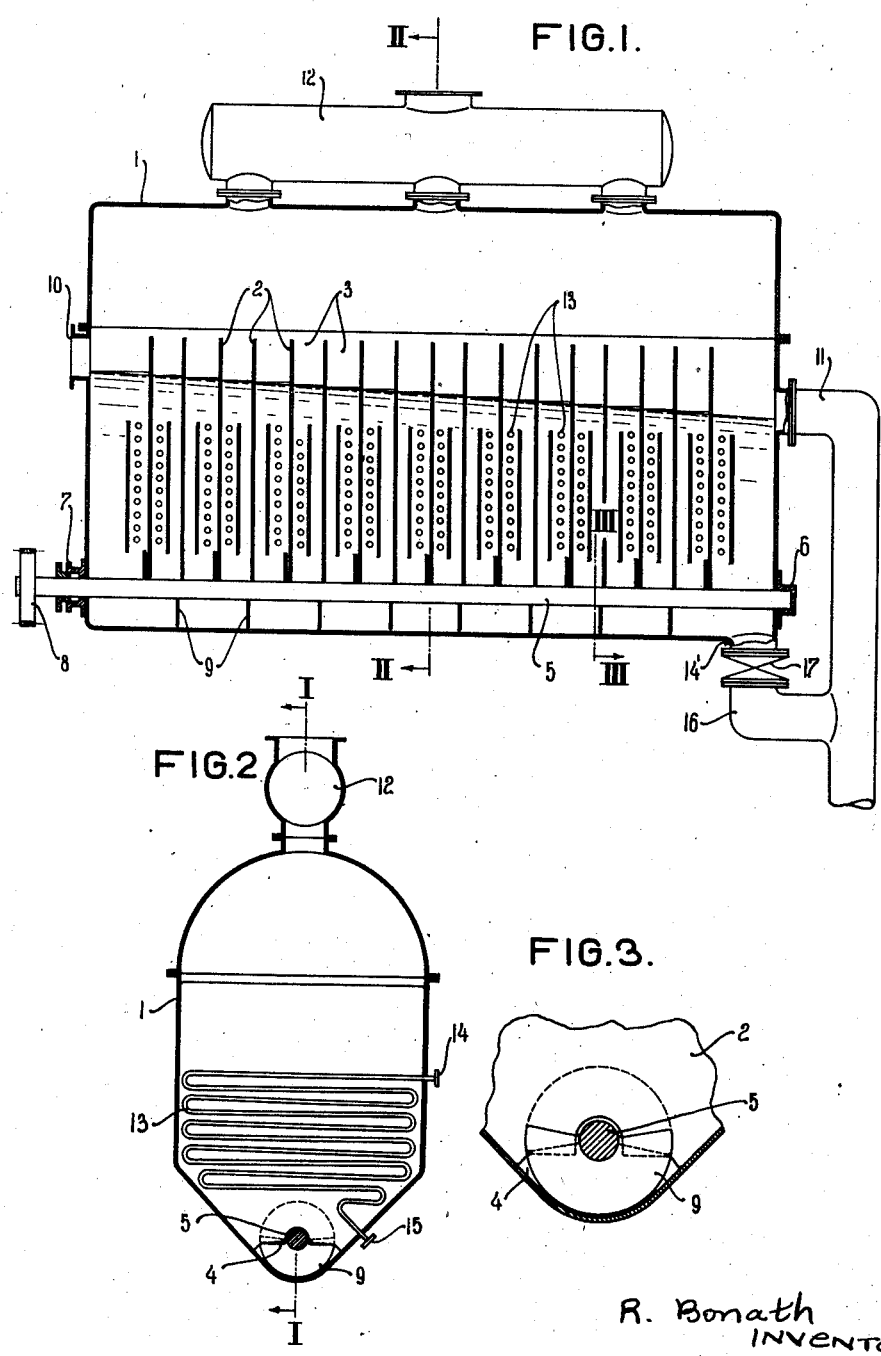

Dec. 4, 1934.    R. BONATH    1,982,978
APPARATUS FOR CRYSTALLIZING SOLUTIONS BY EVAPORATION OR COOLING
Filed Feb. 16, 1932    4 Sheets-Sheet 2

R. Bonath
INVENTOR

By: Marks & Clark
ATTYS.

Dec. 4, 1934.  R. BONATH  1,982,978
APPARATUS FOR CRYSTALLIZING SOLUTIONS BY EVAPORATION OR COOLING
Filed Feb. 16, 1932  4 Sheets-Sheet 3

R. Bonath
INVENTOR

By: Marks & Clerk
Attys.

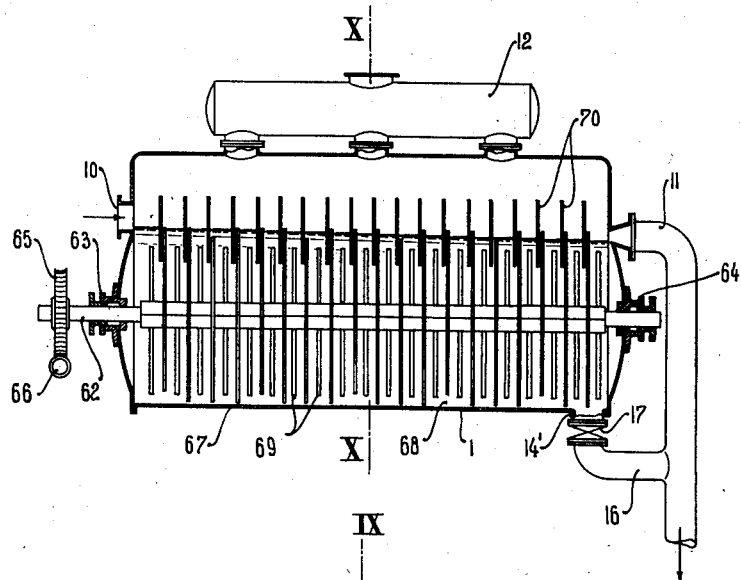
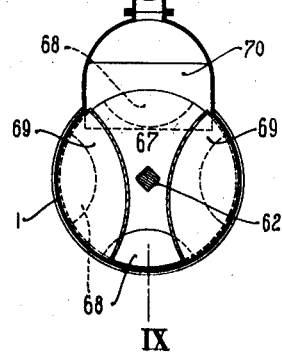

Patented Dec. 4, 1934

1,982,978

UNITED STATES PATENT OFFICE 1,982,978

APPARATUS FOR CRYSTALLIZING SOLUTIONS BY EVAPORATION OR COOLING

Richard Bonath, Bussum, Netherlands, assignor to Werkspoor N. V., Amsterdam, Netherlands, a company of the Netherlands Application February 16, 1932, Serial No. 593,344 In the Netherlands February 28, 1931

5 Claims. (Cl. 159—45)

This invention relates to apparatus for crystallizing solutions by evaporation or cooling.

Apparatus arranged in accordance with this invention are particularly suitable for concentrating sugar juices and syrups, but can also be used as a cooler for cooked mass and for salt solutions.

Crystallizing apparatus suitable for continuous operation are old. In such apparatus, if used as a cooking pan for sugar juices, thick juice is continuously introduced at one end of the apparatus, whereas the concentrated cooked mass is discharged at the other end. It is also old to use such continuous apparatus for cooling solutions.

Known apparatus of this character comprise a horizontal trough divided by partitions into a plurality of compartments. The liquid to be crystallized is subjected, in each compartment, to a heat treatment (heating or cooling), so as to be gradually brought into its final condition. A disadvantageous feature of said apparatus is, however, that it is impossible to ensure that all crystals travel from one compartment to the next one in substantially the same succession wherein they are formed or have grown, the result being that a certain amount of crystals lag behind and give rise to agglomerates of crystals and to the production of crystals of unequal sizes. The provision of a stirring device, or of arms for throwing the mass over the partitions, as often recommended to meet said difficulties, does not give satisfaction. Such stirrers interfere with the uniform flow which, in a continuous apparatus, should take place from inlet to outlet.

A continuous crystallizing apparatus should fulfil the condition that the solution flows uniformly over the heating or cooling surface, otherwise it would not be possible to ensure a uniform growth of the crystals. Therefore, the uniform flow of the mass from inlet to outlet may not be impaired by mixing and stirring devices and it is essential for the mass to be fed, in a homogeneous stream, continuously or intermittently, over the heating or cooling surfaces.

In accordance with the present invention, this result is obtained by the provision of a special system of partitions, comprising, in addition to a series of fixed partitions dividing the trough into a plurality of compartments, a series of rotary partitions which periodically close, wholly or for the greater part, the passages left between the compartments so as to temporarily trap the mass under treatment in one or more adjacent compartments, wherein it remains in contact with the heating (or cooling) surfaces.

The rotary partitions may suitably be sector-shaped and secured to a shaft mounted in the lower part of the stationary trough.

Very good results are obtained when the checking partitions are in the form of interrupted rings so disposed that openings in successive rings are in staggered relation, said rings being secured to the inner wall of a rotary drum and cooperating with stationary central partitions as to periodically check the passage of the mass.

Figure 5:
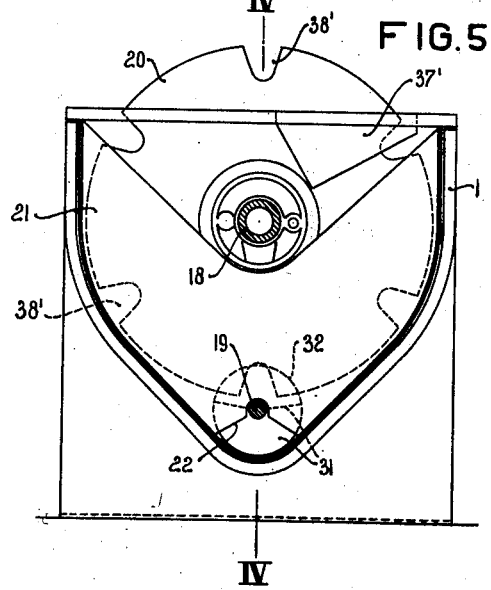
Figure 6:
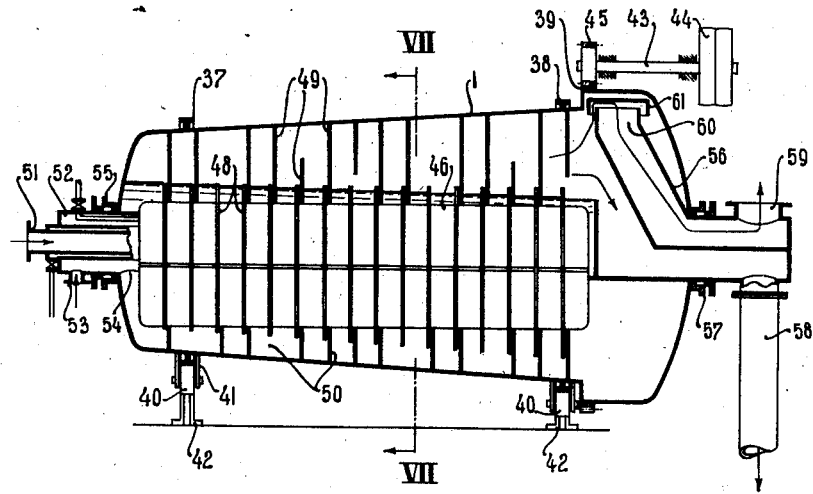
Figure 7:
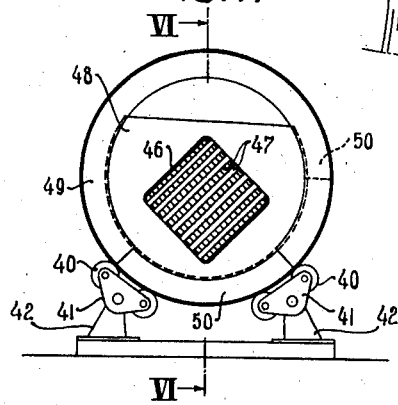
Figure 8:
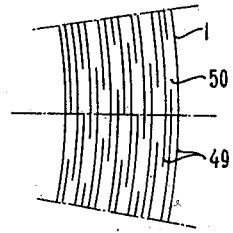

The invention will be described hereinafter in further detail with reference to the drawings, which diagrammatically illustrate four embodiments of a crystallizing apparatus. In this drawing:

Fig. 1 is a longitudinal sectional view, along the line I—I in Fig. 2, of a crystallizing apparatus suitable as a cooking pan, Fig. 2 is a cross sectional view of said pan, along the line II—II in Fig. 1, Fig. 3 is a fragmentary cross sectional view of said pan, along the line III—III in Fig. 1, Fig. 4 is a fragmentary longitudinal sectional view, along the line IV—IV in Fig. 5, of a second embodiment which is especially suitable as a cooler for salt solutions, Fig. 5 is a cross sectional view of said cooler, along the line V—V in Fig. 4, Fig. 6 is partly a longitudinal sectional view along the line VI—VI in Fig. 7, partly an elevation of a third embodiment, acting as a rotary cooking pan, Fig. 7 is a cross sectional view of said cooking pan, along the line VII—VII in Fig. 6, Fig. 8 is a development of the inner surface of the rotary shell of the crystallizing apparatus illustrated in Figs. 6 and 7, Fig. 9 is a longitudinal sectional view, along the line IX—IX in Fig. 10, of a fourth embodiment, Fig. 10 is a cross sectional view along the line X—X in Fig. 9.

The pan 1 shown in Figs. 1–3 is divided, by a series of vertical partitions 2, into a plurality of compartments 3. The partitions 2 do not fully extend to the bottom of the pan, but are spaced therefrom so as to form therewith substantially semi-circular openings or passages 4. Mounted in the lower portion of the pan is a horizontal shaft 5, one end of which is journaled in a bearing 6 of the rear wall of the pan, the other end passing through a stuffing box 7 of the front wall and having keyed thereto a gear wheel 8, by means of which the shaft may be driven.

Secured to the shaft are a series of substantially semi-circular disks 9 staggering through 180° relative to one another and adapted, once every revolution, to close, completely or nearly so, the passages 4. Consequently, the disks 9 are adapted alternately to establish communication between adjacent compartments 3, and break this communication.

The thick juice is continuously run into the pan through a nozzle 10 and continuously discharged therefrom through a pipe 11. The pan is provided with the usual dome 12, connected through a vapour pipe with the vacuum installation. Provided in each compartment 3 of the pan is a coil 13, connected as at 14 to a steam supply pipe and as at 15 to a pump for water of condensation, or to a steam trap.

In Fig. 1, the shaft 5 assumes a position wherein the first two compartments 3 of the pan are in communication with one another, so that the mass is free to continue its travel in horizontal direction. The communication between the second and the third compartment, however, is cut off, as well as that between the fourth and the fifth, the sixth and the seventh compartment, and so on. Consequently, the mass is intermittently trapped in two adjacent compartments, the duration of this stagnation depending upon the angular distance through which the disks 9 in their lowermost positions overlap the fixed partitions 3. It will thus be understood that, in a way, the mass intermittently travels from the one compartment to the next one and that it is simultaneously compelled to flow over the entire heating surface of each compartment.

The flow of the mass may take place under the influence of gravity only, but it is preferably promoted by a screw conveyor mounted on shaft 5, as shown in Fig. 4. During its flow from the one compartment to the other, the mass is gradually concentrated and during its travel thick juice or syrup may be admixed thereto, to which end supply pipes for said materials may be connected to the pan at various points thereof.

In order that the pan may be emptied when, at the end of the cooking process, the level of the mass has fallen below the opening of the discharge pipe 11, the bottom of the pan is provided with a drain opening 14′ connected with the discharge pipe 11 through a branch 16 with valve 17.

The construction of the apparatus just described can still be simplified by making the partitions 2 hollow and by using these as heating elements, in which case the coils 13 may be dispensed with.

In the embodiment shown in Figs. 4 and 5, the trough 1 has an open top and is provided with two rotary shafts 18 and 19. Shaft 18 is hollow and carries a plurality of hollow disks 20 for the circulation of cooling water, which is supplied and discharged through shaft 18. Both ends of this shaft are passed through stuffing boxes 23, 24 on either end of the trough, one end of said shaft being provided with a gear wheel 25 driven by a pinion 27 on a drive shaft 26. Mounted between the disks of each pair of disks 20 is a stationary partition 21, which does not fully extend to the bottom of the trough but is spaced therefrom so as to provide for a passage 22 for the liquid.

One end of the shaft 19 is supported, near the bottom of the trough, in a bearing 28 of the front wall of the trough, its other end extending through a stuffing box 29 of the rear wall, where it carries a pinion 30 meshing with the gear wheel 25 on shaft 18. Mounted on shaft 19 are a series of substantially semi-circular disks 31, which, as distinguished from those of the embodiment shown in Figs. 1–3, are all in alignment with one another and adapted to simultaneously close all the passages 22 provided in the partitions 21. With the disks 31 assuming their lowermost positions, the horizontal flow of the mass through the trough is almost entirely interrupted and the liquid is compelled to flow over the hollow disks 20, the required propelling force being supplied by the screw blades 32 mounted on shaft 19 opposite the disks 31. These screw blades also promote the travel of the liquid in horizontal direction.

The apparatus just described is especially suitable as a cooler for salt solutions, in which the crystals of the salt collect on the bottom and are conveyed by the screw blades 32 in horizontal direction towards the sprocket wheel 34 of a chain pump 33. The driving wheel 36 of said pump is mounted on shaft 26. The salt raised by the pump is discharged into a trough 35, whence it may be further conveyed.

Between the disks of each pair of disks 20, scrapers 37′ are provided to clean said disks during their rotary movement. Each of said disks is provided at its periphery with a plurality of recesses 38′ equally spaced apart in such a manner that during operation the corresponding screw blade 32 in its uppermost position is in mesh with one of said recesses.

In the embodiment shown in Figs. 6 and 7, the crystallizing apparatus is revolubly mounted, whereas the heating device is stationary.

The outer shell 1 is conical and provided with two annular races 37, 38, in addition to a gear rim 39. Through said races the shell is supported by rollers pivoted to either end of links 41 adapted for swinging motion in brackets 42. The shell is driven by a shaft 43 provided with a loose and a fast pulley 44 and carrying a pinion 45 meshing with the gear rim 39.

Mounted within the shell 1 is a stationary steam chest 46 provided with crosswise arranged nests of pipes 47 for the circulation of the mass under treatment. Secured to the outer wall of said chest are a plurality of annular partitions 48, the upper segment of each of which has been cut away. The centres of the peripheries of all partitions 48 are located in the axis of the shell 1, so that said peripheries are spaced equal distances from the inner wall of the shell. The top edges of the partitions 48 are located in a common horizontal plane.

Substantially in the planes of said partitions the shell 1 is provided, on its inner wall, with rings 49, each having a recess or interruption 50. The recesses 50 of adjacent rings are provided in staggered relation and spaced apart through an angular distance of say 135°, so that the recesses of the first and of the ninth ring, as well as those of the second and the tenth ring, etc., are in axial alignment.

When the recess 50 of ring 49 has been raised above the level of the liquid, said ring checks the passage of the liquid between the inner wall of the shell 1 and the corresponding partition 48. Consequently, the liquid will be periodically trapped between a plurality of rings, in the embodiment shown between nine rings.

Since in the last said embodiment the liquid is at any time free to flow through a comparatively great number (eight) of adjacent compartments, the flow of the mass from the inlet to the outlet of the apparatus is practically continuous.

The steam chest 46 is provided with a nozzle 51, to which the steam supply pipe is connected. Said nozzle is surrounded by a chamber 52, to which thick juice is supplied through a nozzle 53, said chamber being provided with an opening 54, through which the juice is fed into the shell 1. The stationary chamber 52 is sealed with respect to the shell 1 by means of a stuffing box 55.

Secured to the rear wall of the steam chest 46 is a bi-part discharge chest 56, the neck of which passes through a stuffing box 57. The lower part of said discharge chest serves for the discharge of the cooked mass and is to this end provided with a discharge pipe 58 outside the shell 1. The upper part of chest 56 serves for discharging the vapors and has a nozzle 59 to which the vapour pipe of the central condensing plant is connected. Vertically above the inlet opening 60 for the vapors is a baffle 61 which prevents any juice, that may be contained in the vapours, from entering into said vapour pipe.

Since in the described apparatus the mass is forced to flow very uniformly over the stationary heating member, said apparatus can be used with special advantage as a continuous cooking pan for sugar juices and syrups.

Figs. 9 and 10 also illustrate an apparatus adapted as a cooking pan. In this embodiment, the pan 1 is provided with a horizontal shaft 62, the ends of which are passed through stuffing boxes 63, 64, of the front and the rear wall of the pan, respectively. The one end of the said shaft is provided with a worm wheel 65, meshing with a worm 66 adapted to be driven in any convenient manner. Mounted on shaft 62 are a series of circular disks 67, the diameter of each of which is substantially equal to the inner diameter of the trough 1. Each disk 67 is provided with a peripheral recess 68, the recesses of adjacent disks being spaced through angular distances of 90°. Secured to the inner wall of the trough 1, intermediate between the disks 67 of each pair, are one or more stationary hollow baffles 69, providing for an opening for the passage of the mass in the central portion of the trough. Said hollow baffles also serve as heating elements and are, to this end, connected to a steam pipe.

The thick juice is fed into the pan through a nozzle 10 and continuously discharged through a pipe 11. The pan is provided in the usual manner with a dome or upper drum 12 connected through a vapour pipe with the central condensation plant.

Also in this embodiment the bottom of the pan is provided with a drain opening 14' connected through a pipe 16 with valve 17 to the discharge pipe 11 and serving for emptying the pan.

In the upper portion of the pan there is provided a series of partitions 70 of rectangular shape, extending downward so far as to cover the recesses 68 of the disks 67, when said recesses are in their uppermost positions.

In this case the passage for the mass is fully checked in the respective section. If, however, disk 67 has moved with its recess 68 beyond the baffle 70, the mass is again free to pass. In the illustrated embodiment, in which the recesses in adjacent disks are spaced 90° apart, at any moment four consecutive compartments of the pan will be in communication with one another, but cut off from the remainder of the pan. In said compartments the horizontal flow of the mass will be checked for a short time, until the disk on the side of the discharge opening has again moved with its recess 68 beyond the corresponding baffle 70. It will thus be seen, that also in this case a horizontal flow will be produced, which, however, will be periodically interrupted during a short time. Owing to the provision of the heating elements 69 intermediate between the disks 67 and to the staggered relation of the recesses 68, the mass is compelled to flow very uniformly over the heating surface, so that the pan is exceptionally suitable as a continuous cooking pan.

Instead of using hollow, stationary baffles 69, the rotary disks 67 may be formed as hollow members and used as heating elements. In that case the apparatus has the advantageous feature that the heating surface moves through the mass, thereby increasing the uniformity in the crystallizing process. Furthermore, each of said rotary disks may be provided with more than one peripheral recess, whereby the flow in horizontal direction will become still more uniform and can practically be considered as continuous.

What I claim is:—

1. In apparatus for crystallizing solutions by evaporation or cooling, a receptacle, a series of stationary plates, dividing the receptacle into a plurality of compartments, said stationary plates having openings for establishing communication between the compartments, a series of sector shaped rotary plates cooperating with said stationary plates and of a size sufficient to close the openings in the stationary plates, a shaft mounted in the lower portion of the receptacle, said rotary plates being secured in staggered relation to said shaft so as to close alternate openings as the shaft is rotated.

2. In apparatus for crystallizing solutions by evaporation or cooling a receptacle, a series of stationary plates located in planes at substantially right angles to the longitudinal axis in the upper portion of the receptacle and dividing the upper portion of the receptacle into a plurality of compartments and a series of rotary plates in said receptacle and occupying that part of the cross sectional area of the receptacle which is left uncovered by the stationary plate, said rotary plates being in the form of circular disks each provided with a peripheral recess, adapted to be periodically covered by the cooperating stationary plate.

3. In apparatus for crystallizing solutions by evaporation or cooling, a receptacle, a series of stationary plates located in planes at substantially right angles to the longitudinal axis of the receptacle and positioned in the upper portion of the receptacle to divide the upper portion of the receptacle into a plurality of compartments, a series of rotary plates in said receptacle and occupying that part of the cross sectional area of the receptacle left vacant by the stationary plates, said rotary plates being in the form of circular disks each provided with a peripheral recess, adapted to be periodically covered by the cooperating stationary plate, and stationary hollow baffles arranged between the rotary plates to partly fill up the cross section of the receptacle and adapted for the circulation of a medium in heat exchange relation with the liquid.

4. In an apparatus for crystallizing solutions by evaporation or cooling, a receptacle, a series of stationary plates for dividing the receptacle into a plurality of compartments, said stationary partitions having openings for establishing communication between the compartments, and a series of rotary plates in said receptacle, each rotary plate being arranged adjacent the corresponding stationary plate and of such a size and shaped and angularly displaced with relation to each other to periodically close the passage for the liquid left by the stationary plates.

5. In an apparatus for crystallizing solutions by evaporation or cooling, a receptacle, a series of stationary plates arranged in the receptacle and located in planes at right angles to the longitudinal axis of the receptacle to divide the receptacle into a series of chambers, said plates having passages to establish communication between the chambers, and a series of rotary plates mounted in staggered relation in the receptacle, each rotary plate being arranged adjacent the corresponding stationary plate and of such a size and shape so as to be adapted to periodically close the passage for the liquid left by the stationary plates.

RICHARD BONATH.